US009323599B1

(12) United States Patent
Iyer et al.

(10) Patent No.: US 9,323,599 B1
(45) Date of Patent: Apr. 26, 2016

(54) TIME SERIES METRIC DATA MODELING AND PREDICTION

(71) Applicant: AppDynamics, Inc., San Francisco, CA (US)

(72) Inventors: Arjun Iyer, San Mateo, CA (US); Yuchen Zhao, Belmont, CA (US)

(73) Assignee: AppDynamics, Inc., San Francisco, CA (US)

( * ) Notice: Subject to any disclaimer, the term of this patent is extended or adjusted under 35 U.S.C. 154(b) by 0 days.

(21) Appl. No.: 14/814,815

(22) Filed: Jul. 31, 2015

(51) Int. Cl.
  *G06F 11/00* (2006.01)
  *G06F 11/07* (2006.01)

(52) U.S. Cl.
  CPC .......... *G06F 11/079* (2013.01); *G06F 11/0751* (2013.01)

(58) Field of Classification Search
  CPC ..................................................... G06F 11/079
  USPC ............... 714/37, 36, 38, 39, 40, 38.1, 38.12, 714/38.13
  See application file for complete search history.

(56) References Cited

U.S. PATENT DOCUMENTS

| | | | | |
|---|---|---|---|---|
| 7,310,590 | B1 * | 12/2007 | Bansal | G06F 11/0751 702/181 |
| 8,099,257 | B2 * | 1/2012 | Parvin | G06F 19/366 702/179 |
| 2007/0088534 | A1 * | 4/2007 | MacArthur | G05B 13/0295 703/17 |
| 2014/0108324 | A1 * | 4/2014 | Chen | G06F 17/18 706/52 |
| 2015/0242747 | A1 * | 8/2015 | Packes | G06Q 50/16 706/17 |
| 2015/0339265 | A1 * | 11/2015 | Thibaux | G06F 17/18 702/179 |

* cited by examiner

*Primary Examiner* — Dieu-Minh Le
(74) *Attorney, Agent, or Firm* — Bachman Law Group

(57) ABSTRACT

A system that utilizes a plurality of time series of metric data to more accurately detect anomalies and model and predict metric values. Streams of time series metric data are processed to generate a set of independent metrics. In some instances, the present system may automatically analyze thousands of real-time streams. Advanced machine learning and statistical techniques are used to automatically find anomalies and outliers from the independent metrics by learning latent and hidden patterns in the metrics. The trends of each metric may also be analyzed and the trends for each characteristic may be learned. The system can automatically detect latent and hidden patterns of metrics including weekly, daily, holiday and other application specific patterns. Anomaly detection is important to maintaining system health and predicted values are important for customers to monitor and make planning and decisions in a principled and quantitative way.

24 Claims, 9 Drawing Sheets

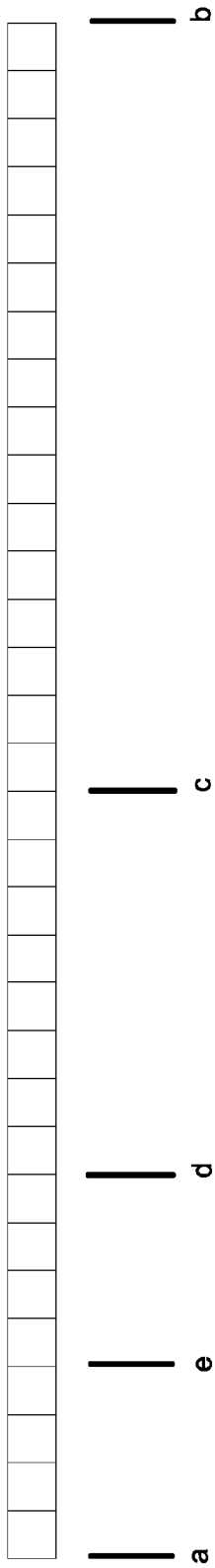
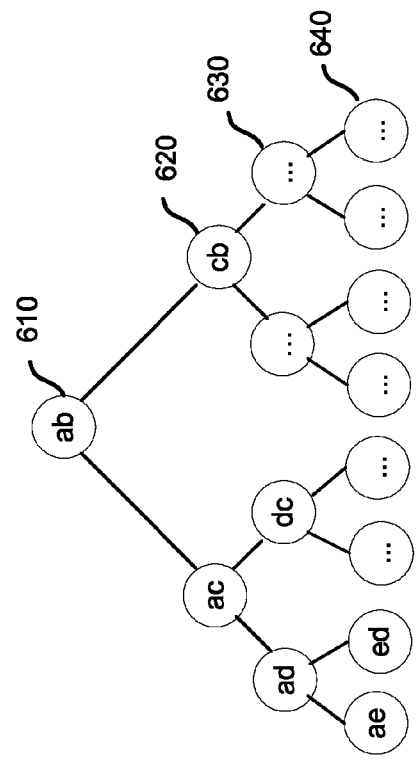
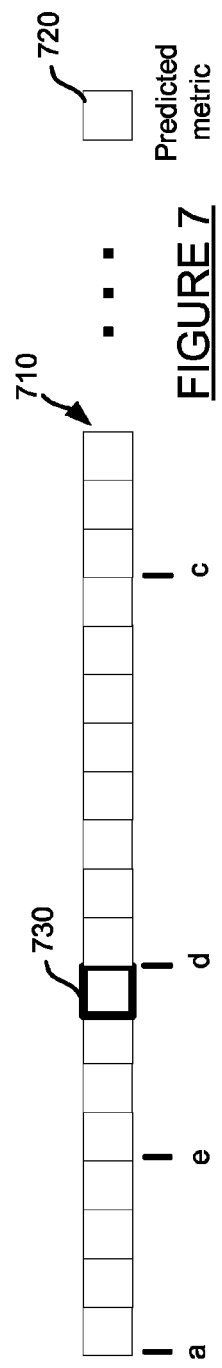

TIME SERIES METRIC DATA MODELING AND PREDICTION

BACKGROUND

The World Wide Web has expanded to provide numerous web services to consumers. The web services may be provided by a web application which uses multiple services and applications to handle a transaction. The applications may be distributed over several machines, making the topology of the machines that provide the service more difficult to track and monitor.

Monitoring a web application helps to provide insight regarding bottle necks in communication, communication failures and other information regarding performance of the services that provide the web application. Most application monitoring tools provide a standard report regarding application performance. Though the typical report may be helpful for most users, it may not provide the particular information that an administrator wants to know.

Metric production an anomaly detection is often performed based on a single metric history. Anomaly detection using a single metric provides for a very limited view of the health of a system from which the metric is retrieved. As such, this is not always an accurate method to determine the health of a system. What is needed is an improved method for predicting and detecting anomalies for the monitored system.

SUMMARY

The present technology, roughly described, utilizes a plurality of metrics to perform a more accurate prediction and anomaly detection analysis. A set of time series of metric data are analyzed to generate a set of independent metrics. The analysis may include performing component analysis techniques to generate independent metrics from the original metrics. The independent metrics are then processed by wavelet transformation to generate a series of average values over different sets of data, when each data is associated with metadata such as time, location, and other metadata. A prediction of a future time may be made by generating a value that corresponds, for example as an average, to previous values with similar metadata to the expected for the predicted value. The predicted value is then process with a reverse wave transformation and a reverse component analysis technique. This reverse process generates a prediction in terms of the original metrics from the independent metrics for which the prediction was first generated. When the actual metric is generated at the predicted time, the actual value is compared to the predicted value. If the difference is greater than a threshold, and anomaly is determined to have occurred. If a metric experiences a pattern that is part of a larger multi-metric pattern associated with a condition of concern or interest, an alert is generated.

An embodiment may include a method for detecting an anomaly in time-series data. A plurality of time series of original metric data may be received. A component analysis may be performed to generate a plurality of time series of independent metric data. A function may be performed to provide coefficients having a varying granularity for the plurality of time series of independent metric data. A value may be predicted for the independent metric time series data based on the varying granularity coefficients. The predicted value for the independent metric time series data may be converted to an original metric data value. The actual value of the original metric time series data may be determined to be an anomaly if the actual value for the metric differs from the predicted value for the metric by more than a threshold.

An embodiment may include a system for detecting an anomaly in time-series data. The system may include a processor, memory, and one or more modules stored in memory and executable by the processor. When executed, the modules may receive a plurality of time series of original metric data, perform component analysis to generate a plurality of time series of independent metric data, perform a function to provide coefficients having a varying granularity for the plurality of time series of independent metric data, predict a value for the independent metric time series data based on the varying granularity coefficients, convert the predicted value for the independent metric time series data to an original metric data value, and determine the actual value of the original metric time series data is an anomaly if the actual value for the metric differs from the predicted value for the metric by more than a threshold.

BRIEF DESCRIPTION OF THE DRAWINGS

FIG. 5 is an illustration of a time series of independent data to be processed by a wavelet transform.

FIG. 6 is an illustration of a tree of data generated by performing a wavelet transform on time series data.

FIG. 7 is an example of a predicted metric based on independent metric data and wavelet transform data.

DETAILED DESCRIPTION

The present technology, roughly described, utilizes a plurality of metrics to more accurately detect anomalies and model and predict metric values. Streams of time series metric data are processed to generate a set of independent metrics. In some instances, the present system may automatically analyze thousands of real-time streams. Advanced machine learning and statistical techniques are used to automatically find anomalies and outliers from the independent metrics by learning latent and hidden patterns in the metrics. The trends of each metric may also be analyzed and the trends for each characteristic may be learned. The system can automatically detect latent and hidden patterns of metrics including weekly, daily, holiday and other application specific patterns. Anomaly detection is important to maintaining system health and predicted values are important for customers to monitor and make planning and decisions in a principled and quantitative way.

To detect anomalies, real-time time series metric data streams are processed by component analysis techniques and singular value decomposition. These techniques generate one or more time series of independent metrics from the original metric streams. The decomposition of the original metric streams into the independent metric streams allows for automatic extraction of meaningful latent patterns that represent hidden and latent aspects of the metrics. This allows for analysis of the metric patterns to determine a seasonal or periodic change in metric values versus a true anomaly.

The independent metrics may then be processed by discrete wavelet transform (DWT) to generate wavelet coefficients. The coefficients wavelet coefficients represent patters for the metrics with different granularity, and may thus represent the latent characteristics of the metrics. The system may automatically learn weights associated with wavelet coefficients using an algorithm on recursive least squares (RLS) that works efficiently for fast real-time metric streams. Through this automated process, the present system can accurately and efficiently predict future metric values and provide insights to users in areas such as capacity planning, revenue forecasting, performance monitoring, and so on.

Figure 1:
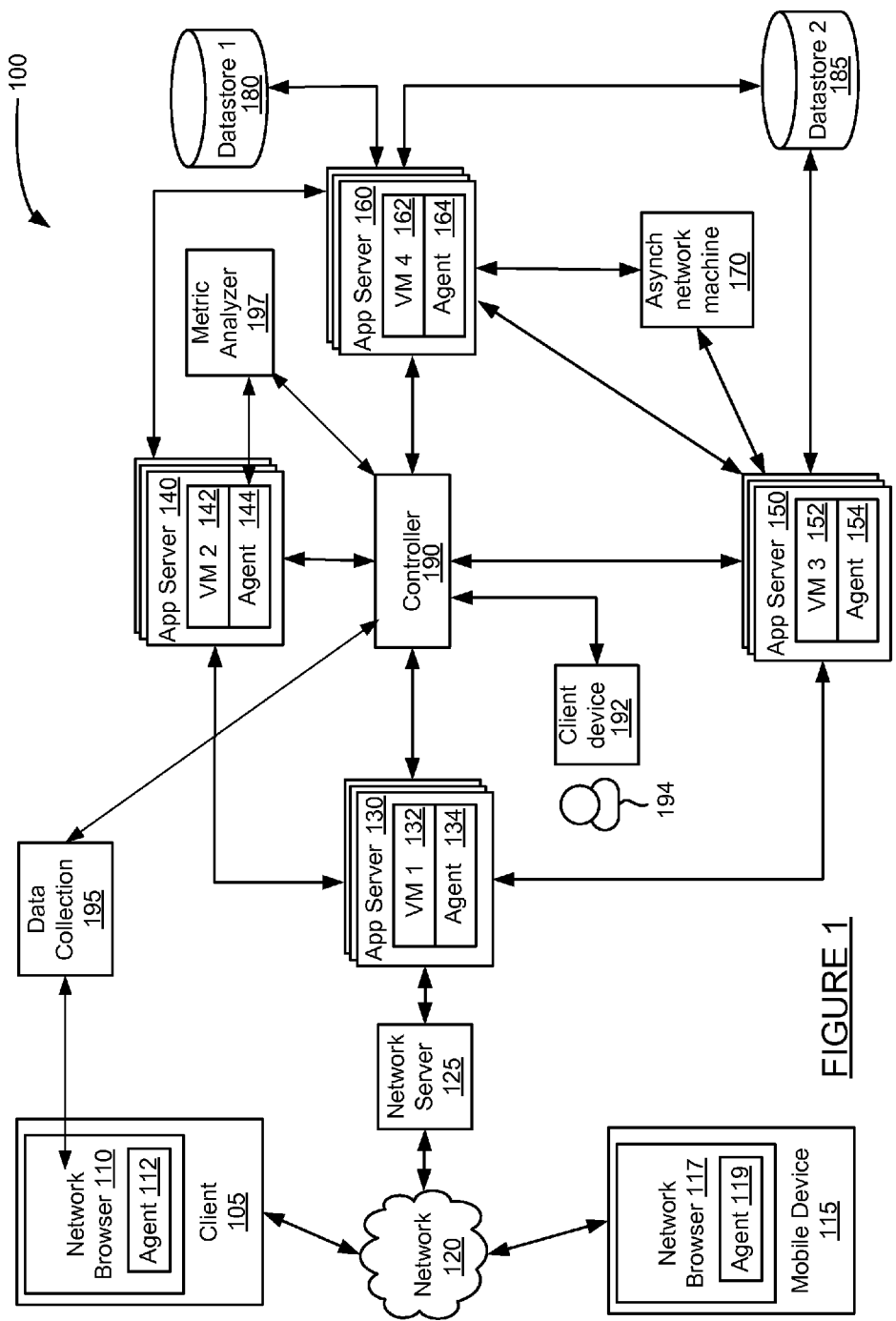
FIG. 1 is a block diagram of a system for predicting metric values and determining an anomaly.

FIG. 1 is a block diagram of a system for correlating an application and network performance data. System 100 of FIG. 1 includes client device 105 and 192, mobile device 115, network 120, network server 125, application servers 130, 140, 150 and 160, asynchronous network machine 170, data stores 180 and 185, controller 190, and data collection server 195.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120.

Network browser 110 may include agent 112. Agent 112 may be installed on network browser 110 and/or client 105 as a network browser add-on, downloading the application to the server, or in some other manner. Agent 112 may be executed to monitor network browser 110, the operation system of client 105, and any other application, API, or other component of client 105. Agent 112 may determine network browser navigation timing metrics, access browser cookies, monitor code, and transmit data to data collection 160, controller 190, or another device. Agent 112 may perform other operations related to monitoring a request or a network at client 105 as discussed herein.

Mobile device 115 is connected to network 120 and may be implemented as a portable device suitable for sending and receiving content over a network, such as for example a mobile phone, smart phone, tablet computer, or other portable device. Both client device 105 and mobile device 115 may include hardware and/or software configured to access a web service provided by network server 125.

Mobile device 115 may include network browser 117 and an agent 119. Agent 119 may reside in and/or communicate with network browser 117, as well as communicate with other applications, an operating system, APIs and other hardware and software on mobile device 115. Agent 119 may have similar functionality as that described herein for agent 112 on client 105, and may repot data to data collection server 160 and/or controller 190.

Network 120 may facilitate communication of data between different servers, devices and machines of system 100 (some connections shown with lines to network 120, some not shown). The network may be implemented as a private network, public network, intranet, the Internet, a cellular network, Wi-Fi network, VoIP network, or a combination of one or more of these networks. The network 120 may include one or more machines such as load balance machines and other machines.

Network server 125 is connected to network 120 and may receive and process requests received over network 120. Network server 125 may be implemented as one or more servers implementing a network service, and may be implemented on the same machine as application server 130. When network 120 is the Internet, network server 125 may be implemented as a web server. Network server 125 and application server 130 may be implemented on separate or the same server or machine.

Application server 130 communicates with network server 125, application servers 140 and 150, and controller 190. Application server 130 may also communicate with other machines and devices (not illustrated in FIG. 1). Application server 130 may host an application or portions of a distributed application. The host application 132 may be in one of many platforms, such as for example a Java, PHP, .NET, Node.JS, be implemented as a Java virtual machine, or include some other host type. Application server 130 may also include one or more agents 134 (i.e. "modules"), including a language agent, machine agent, and network agent, and other software modules. Application server 130 may be implemented as one server or multiple servers as illustrated in FIG. 1.

Application 132 and other software on application server 130 may be instrumented using byte code insertion, or byte code instrumentation (BCI), to modify the object code of the application or other software. The instrumented object code may include code used to detect calls received by application 132, calls sent by application 132, and communicate with agent 134 during execution of the application. BCI may also be used to monitor one or more sockets of the application and/or application server in order to monitor the socket and capture packets coming over the socket.

In some embodiments, server 130 may include applications and/or code other than a virtual machine. For example, server 130 may include Java code, .NET code, PHP code, Ruby code, C code or other code to implement applications and process requests received from a remote source.

Agents 134 on application server 130 may be installed, downloaded, embedded, or otherwise provided on application server 130. For example, agents 134 may be provided in server 130 by instrumentation of object code, downloading the agents to the server, or in some other manner. Agents 134 may be executed to monitor application server 130, monitor code running in a or a virtual machine 132 (or other program language, such as a PHP, .NET, or C program), machine resources, network layer data, and communicate with byte instrumented code on application server 130 and one or more applications on application server 130.

Each of agents 134, 144, 154 and 164 may include one or more agents, such as a language agents, machine agents, and network agents. A language agent may be a type of agent that is suitable to run on a particular host. Examples of language agents include a JAVA agent, .Net agent, PHP agent, and other agents. The machine agent may collect data from a particular machine on which it is installed. A network agent may capture network information, such as data collected from a socket.

Agent 134 may detect operations such as receiving calls and sending requests by application server 130, resource usage, and incoming packets. Agent 134 may receive data, process the data, for example by aggregating data into metrics, and transmit the data and/or metrics to controller 190. Agent 134 may perform other operations related to monitoring applications and application server 130 as discussed herein. For example, agent 134 may identify other applications, share business transaction data, aggregate detected runtime data, and other operations.

An agent may operate to monitor a node, tier or nodes or other entity. A node may be a software program or a hardware component (memory, processor, and so on). A tier of nodes may include a plurality of nodes which may process a similar business transaction, may be located on the same server, may be associated with each other in some other way, or may not be associated with each other.

Agent 134 may create a request identifier for a request received by server 130 (for example, a request received by a client 105 or 115 associated with a user or another source). The request identifier may be sent to client 105 or mobile device 115, whichever device sent the request. In embodiments, the request identifier may be created when a data is collected and analyzed for a particular business transaction. Additional information regarding collecting data for analysis is discussed in U.S. patent application no. U.S. patent application Ser. No. 12/878,919, titled "Monitoring Distributed Web Application Transactions," filed on Sep. 9, 2010, U.S. Pat. No. 8,938,533, titled "Automatic Capture of Diagnostic Data Based on Transaction Behavior Learning," filed on Jul. 22, 2011, and U.S. patent application Ser. No. 13/365,171, titled "Automatic Capture of Detailed Analysis Information for Web Application Outliers with Very Low Overhead," filed on Feb. 2, 2012, the disclosures of which are incorporated herein by reference.

Each of application servers 140, 150 and 160 may include an application and agents. Each application may run on the corresponding application server. Each of applications 142, 152 and 162 on application servers 140-160 may operate similarly to application 132 and perform at least a portion of a distributed business transaction. Agents 144, 154 and 164 may monitor applications 142-162, collect and process data at runtime, and communicate with controller 190. The applications 132, 142, 152 and 162 may communicate with each other as part of performing a distributed transaction. In particular each application may call any application or method of another virtual machine.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. In some embodiments, controller 190 may receive application data, including data associated with monitoring client requests at client 105 and mobile device 115, from data collection server 160. In some embodiments, controller 190 may receive application monitoring data, machine monitoring data, and network data from each of agents 112, 119, 134, 144 and 154. Controller 190 may associate portions of business transaction data, communicate with agents to configure collection of data, and provide performance data and reporting through an interface. The interface may be viewed as a web-based interface viewable by client device 192, which may be a mobile device, client device, or any other platform for viewing an interface provided by controller 190. In some embodiments, a client device 192 may directly communicate with controller 190 to view an interface for monitoring data.

Client device 192 may include any computing device, including a mobile device or a client computer such as a desktop, work station or other computing device. Client computer 192 may communicate with controller 190 to create and view a custom interface. In some embodiments, controller 190 provides an interface for creating and viewing the custom interface as content page, e.g. a web page, which may be provided to and rendered through a network browser application on client device 192.

The system of FIG. 1 may also include metric analyzer 197, which may communicate with controller 190 and any agent, including agents 134, 144, 154, and 164 (not all connections shown in FIG. 1). The metric analyzer 197 may process metrics to determine anomalies, perform modeling, predict values, and generate alerts. Metric analyzer 197 may be implemented as a separate machine in communication with different machines of the system of FIG. 1, may be implemented in controller 190, or may be distributed over multiple machines in the system of FIG. 1.

Analyzer 197 may create independent metrics from original metrics using component analysis techniques such as principal component analysis (PCA) and independent component analysis (ICA), as well as perform singular value decomposition (SVD) on metric values. The resulting independent metric streams may then be processed using discrete waveform transformation (DWT) to generate wavelet coefficients having different levels of granularity. The wavelet coefficients may be then by be processed using a recursive least square (RLS) algorithm to learn weighting of the coefficients. The weighted wavelet coefficients may be used to predict future values of independent metrics and the corresponding original metrics. In particular, the metric analyzer may reverse the wavelet transformation and component analysis techniques to provide the prediction in terms of the original metrics. Once a predicted metric has an actual value, an anomaly may be detected when the actual metric is determined and turns out to be greater than the predicted metric by a particular threshold.

Figure 2:
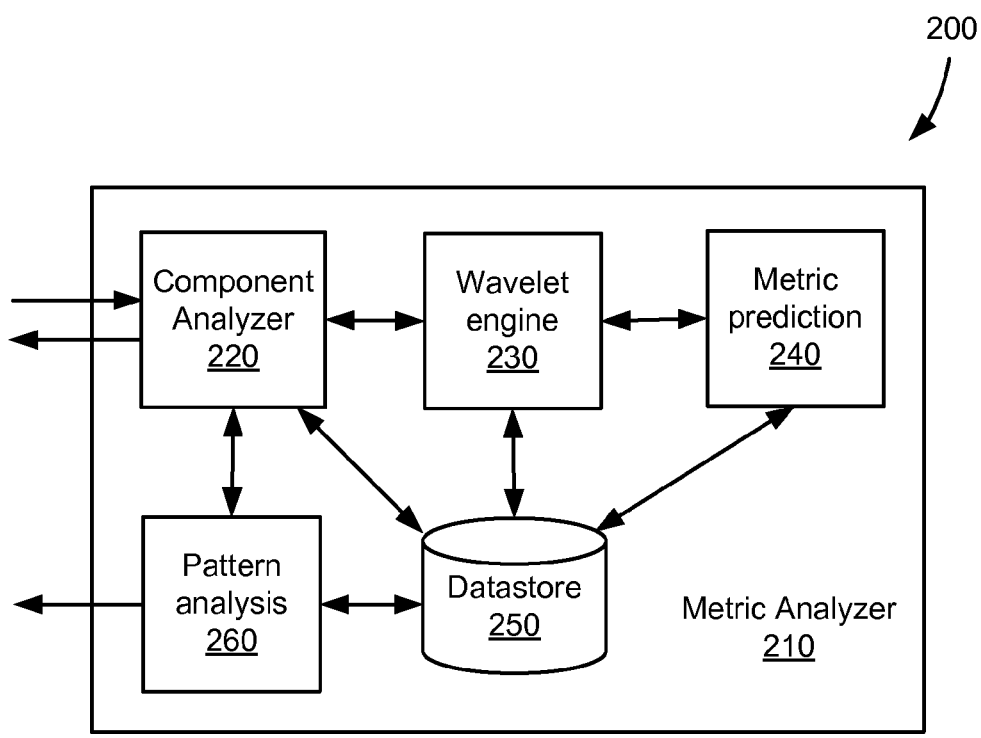
FIG. 2 is a block diagram of a metric analyzer

FIG. 2 is a block diagram of metric analyzer 210. Metric analyzer 210 includes component analyzer 220, wavelet engine 230, metric prediction 240, data store 250, and pattern analysis to 60. Component analyzer 220 may perform composition analysis techniques and other techniques to multiple time series of metric data to generate independent time series of metric data. The composition techniques may include PCA and ICA, and other techniques may include singular value decomposition (SVD). The resulting independent time series of metric data will include latent patterns in the input group of metrics.

Figure 4:
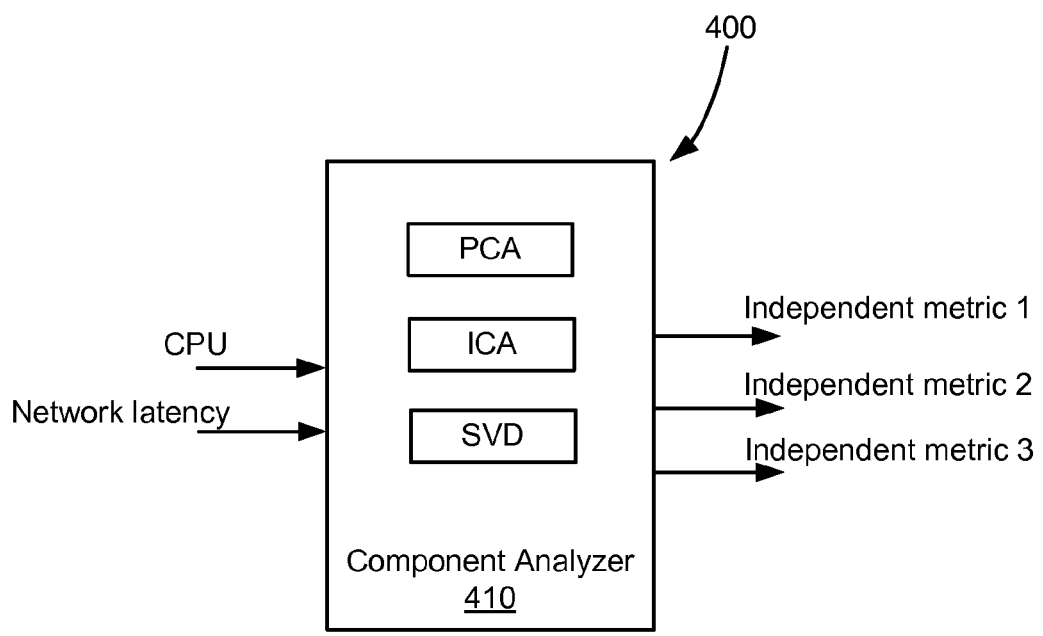
FIG. 4 is a block diagram of a component analyzer.

More detail for a component analyzer is shown in FIG. 4. As shown in FIG. 4, the metrics received by the component analyzer may be any type of metric, including a metric generated by a language agent that monitors an application, a machine agent that monitors a physical machine, and a network agent that monitors a network. In the example illustrated in FIG. 4, metrics of CPU cycles and network latency are received by the component analyzer 410. After being processed by PCA, ICA and SVD, one or more independent metrics may be generated from the original metrics input into the analyzer 410. In the example shown in FIG. 4, three independent metrics are generated after receiving the two original metrics. In some implementations, the number of original metrics that may be input into a component analyzer may up to, and over, a thousand real time time-series metric data streams.

Returning to FIG. 2, once independent metrics are generated by the component analyzer, wavelet engine 230 may perform a discrete wavelet transform (DWT) on the independent metrics to generate wavelet coefficients. The wavelet coefficients may be viewed as a tree of values, with the parent node having a large granularity and the nodes furthest from the root node having a small granularity. FIG. 5 illustrates a time series of data for a particular independent metric. The tree structure generated through DWT is illustrated in FIG. 6. In some instances, each value in the tree is derived from time series data associated with its parent node, for example as an average of half the time series data associated with its parent node. In one implementation, for example, the root note 610 is taken as the average of the time series values between point A and point B. The child nodes of AB are taken as the average of half the time series values that make up A through B. Thus, half of A-B includes time series values A-C. The other child of the root node is generated from the average of time series values from C-B. The child nodes of AC and CB comprise the second level of granularity at level 630. Similarly, level of child nodes may each be broken up into two child notes for each child. This is shown at child level 640. For example, child AC may be divided into children AD and DC. Child AD is an average of the time series values from point A to point D. Similarly, in the child level 640, child AD may be broken up into values AD and ED, which each include the average of the time series values in half of the values associated with AD.

Returning to FIG. 2, metric prediction module 240 may be used to predict a future value of a metric once the wavelet engine values have been generated. Metric prediction 240 may perform recursive least squares (RLS) on the wavelet coefficients to learn weights of the different coefficients with different granularities. The prediction module 240 may then generate a predicted value for the independent metric time series data based on the weighted coefficients. To generate predicted values, local data associated with the time for the prediction is used to find coefficients that are relevant to the prediction. For example, if a prediction for the night before a Holiday at 8 pm is desired, the weighted coefficients that correspond to similar such situations may be used to generate the prediction. The predicted value may then undergo a reverse wavelet transform by wavelet engine 230, followed by a reverse component analysis by analyzer 220 to generate the metric prediction in terms of the original metric.

Data store 250 may store data and communicate with component analyzer 220, wavelet engine 230, metric prediction 240, pattern analysis 260, and any other portion of metric analyzer 210. Datastore 220 may store original metric data, independent metric data, predicted data, tree data, and other data and information associated with processing performed at metric analyzer 210.

Pattern analysis 260 may analyze a pattern of metrics to detect a condition or event. In some instances, a certain condition may cause patterns in a group of metrics. Often times, the condition degrades the performance of the system but certain parts of the system experience the degraded performance later than other parts. Pattern analysis 260 may store these patterns for a group of metrics, and may provide an alert when the pattern first appears to be displayed by the first metric. The pattern analysis may be may be performed on the original metrics or independent metrics provided by component analyzer 220. Additionally, the pattern analysis may be performed on current metrics as well as predicted metrics output by component analyzer 220.

Figure 3:
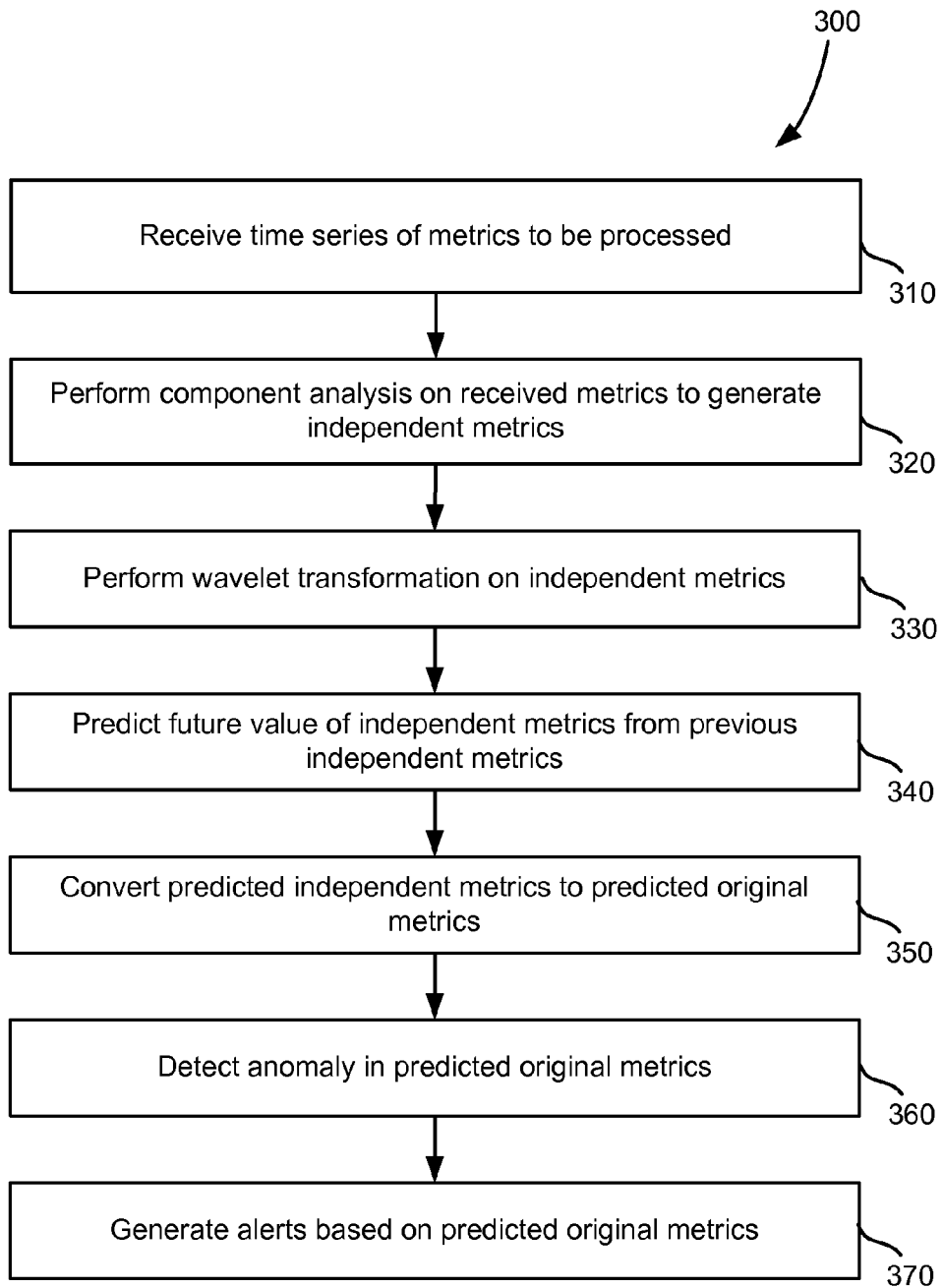
FIG. 3 is a method for generating and anomaly.

FIG. 3 is a method for detecting an anomaly in a time series of metric data. First, a plurality of time series of metric data is received at step 310. The metrics may be received by the metric analysis module and may be calculated for several types of monitored processes and systems, such as for example application data, machine data, network data, and other data over time.

Next, a component analysis is performed on the received metrics to generate independent metrics at step 320. The component analysis may include performing PCA, ICA, as well as SVD on the received original metrics. Performing one or more component analysis techniques on received original metric time series data may result in generating one or more independent time series of metric data. As shown in FIG. 4, one or more original metric time series data may be received by a component analyzer, the original metrics may be process, with the resulting generation of one or more independent metric times series data.

A discrete wavelet transform may be performed on the independent metrics at step 330. The DWT may provide an output of wavelet coefficients having different levels of granularity. As shown in FIG. 6, the independent metric time series shown in FIG. 5 may, when processed by a wavelet transform, provide a hierarchical tree with a root node, child nodes, grandchild nodes, and so forth, such that each level of child node reaching further away from the root node provides a greater level of granularity.

A future value of the independent metrics may be predicted from the previous independent metrics at step 340. To predict a future value of an independent metric, the wavelet coefficients may be weighted, for example using an RLS algorithm, and the desired time for the predicted metric is determined. Previous wavelet coefficients with local data (such as day of the week, time) that is similar to the expected local data for the predicted time is then used to determine wavelet coefficients and an appropriate level granularity from which to predict the metric value. The selected weighted metrics values are then used to determine the predicted metric value.

Once the predicted value of the independent metric is determined, the predicted independent metrics are converted back to the predicted original metrics format at step 340. Converting the predicted independent metric to the predicted original metric includes performing a reverse discrete wavelet transform to provide independent metrics, and then performing a reverse analysis of the PCA, ICA, SVD, and any other techniques applied to the original metric data. The reverse component analysis results in a predicted value in the form of the original metric.

An anomaly may be detected in the predicted original metrics at step 360. The anomaly may be detected at the time at which the metric was predicted once the actual value of the metric is known. Comparing a predicted value to an actual value of the point time is discussed in more detail with respect to the method of FIG. 8.

Alerts may be generated based on the predicted original metrics at step 370. The alerts may be generated based on the recognition of a pattern that is associated with an alert event. Generating an alert based on a predicted original metric is discussed in more detail with respect to the method of FIG. 9.

Figure 8:
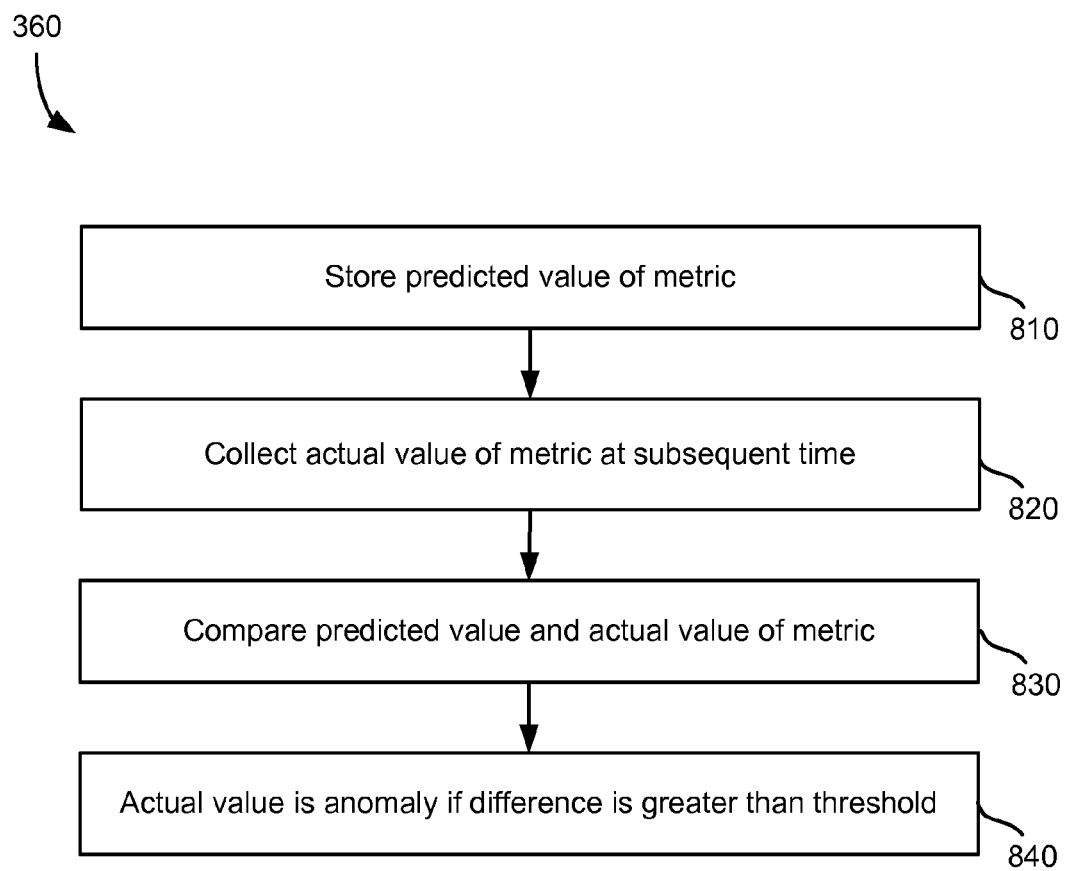
FIG. 8 is a method for detecting and anomaly based on a predicted original metric.

FIG. 8 is a method for detecting an anomaly based on predicted values of a metric. The method of FIG. 8 provides more detail for step 360 of the method of FIG. 3. First, a predicted value of a metric is stored at step 810. The predicted value is generated by the metric analyzer and may be stored in datastore 250 of metric analyzer 210 or any other data store of the system of FIG. 1, such as a store 180 or 185. Next, the actual value of the metric at a subsequent time is eventually collected at step 820.

The predicted value and the actual value for the original metric are compared at step 830. If the actual value differs from the predicted value by more than a threshold, the actual value is determined to be an anomaly at step 840. The threshold may include a percentage of the predicted value, such as plus or minus 10% of the predicted metric value, a number of standard deviations such as for example a second standard deviation, or some other range in relation to the predicted metric value. If an anomaly is indeed detected, the system may provide an alert to a user or administrator, such as for example through a user interface, through a messaging system, or in some other manner.

Figure 9:
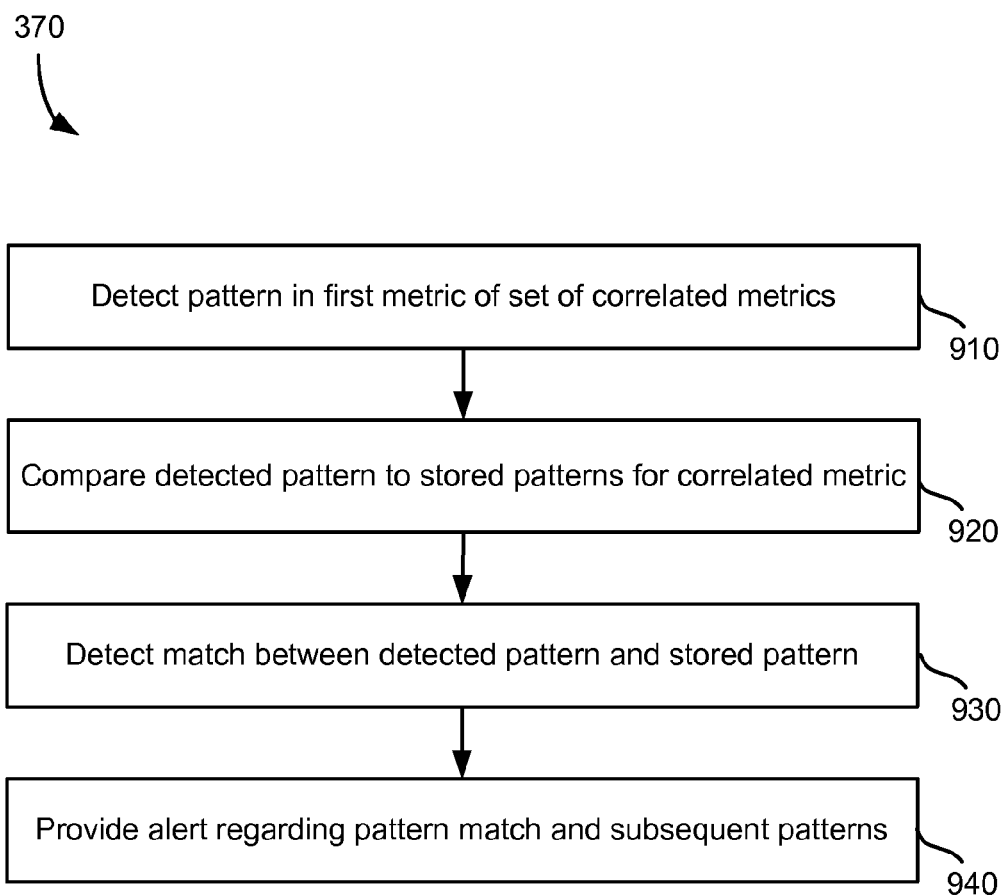
FIG. 9 say method for generating alerts based on predicted original metrics.
Figure 10:
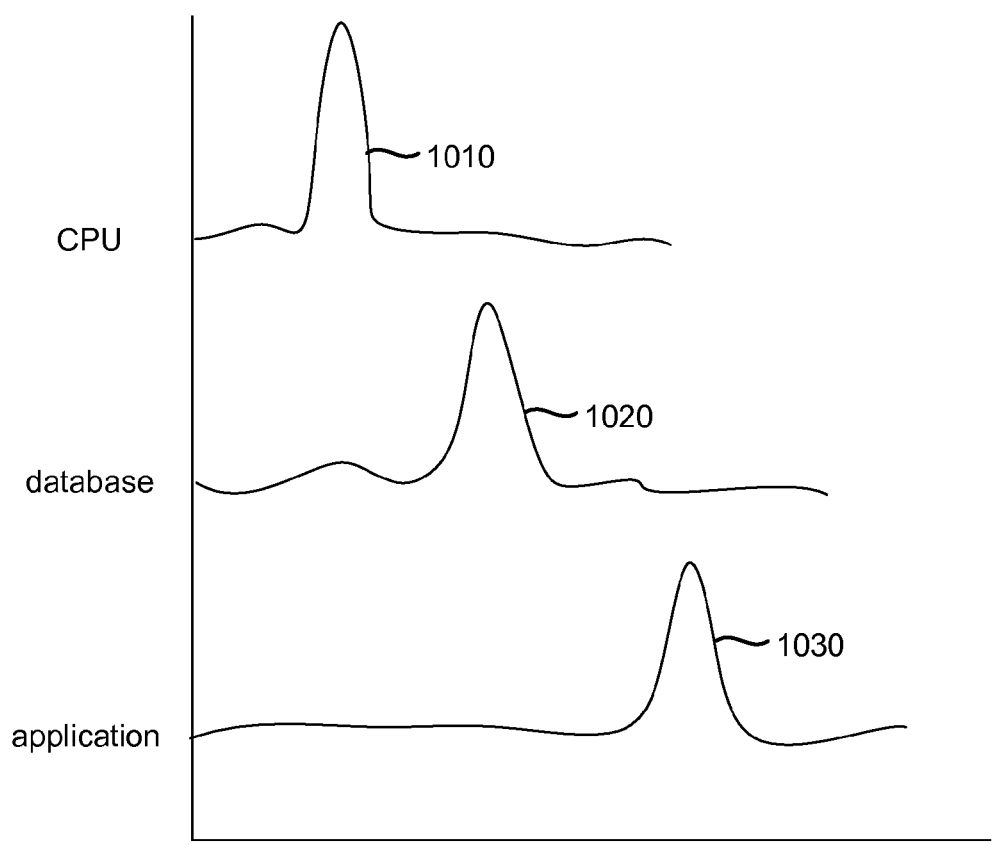
FIG. 10 is a graphical illustration of a series of time series data of metrics associated with an event.

FIG. 9 is a method for generating alerts based on a predicted original metric. A pattern may be detected in the first metric of a set of correlated metrics at step 910. In some instances, a condition may correspond to a particular pattern in a set of metrics. For example, FIG. 10 illustrates a graph of metric values for a condition associated with an outage for a particular application. An outage may correspond to uncharacteristic spikes in metric values for several metrics, such as a central processing unit (CPU) usage, database processing time, and an application response time.

Next, the detected pattern may be compared to a stored pattern for the correlated metric at step 920. In this pattern of metrics associated with an application outage, the CPU may experience an uncharacteristic spike in CPU usage metrics at a first point in time, a spike in database response time metrics at a second and subsequent time, and an uncharacteristic spike in application response time metric values at a point time after the spike associated with the database response time. This pattern of metric values for an outage is illustrated in FIG. 10. By monitoring these metric values in relation to each other, an outage may be detected early through monitoring actual or predicted values of one of a plurality of metrics tied to a condition or event. In some instances, the metrics forming the pattern may be associated with independent metrics generated via component processing of original metrics rather than analyzing the original metrics themselves. In any case, if the condition associated with the pattern of metric behavior is detected early enough, a user may be notified to monitor the resource, application, network, or other metrics such that if the condition is truly occurring, it may be quickly addressed by a user.

A determination is made that a match exists between the detected pattern and the stored pattern at step 920. The match may be based on one or more metrics that form the pattern. Hence, the match may be based on just the CPU metric, the CPU and the database metric, or in some other combination of metrics. An alert may be generated and transmitted to a user regarding the pattern match and subsequent patterns at step 940. Once the match is detected, the user may be notified with an alert that a power outage may be occurring which will affect the performance of the database and the application, or other nodes or resources involved with the particular outage, and that action should be taken to prevent the fallout cause by the notes and resources affected by the power outage or other condition associated with the pattern of metrics.

Figure 11:
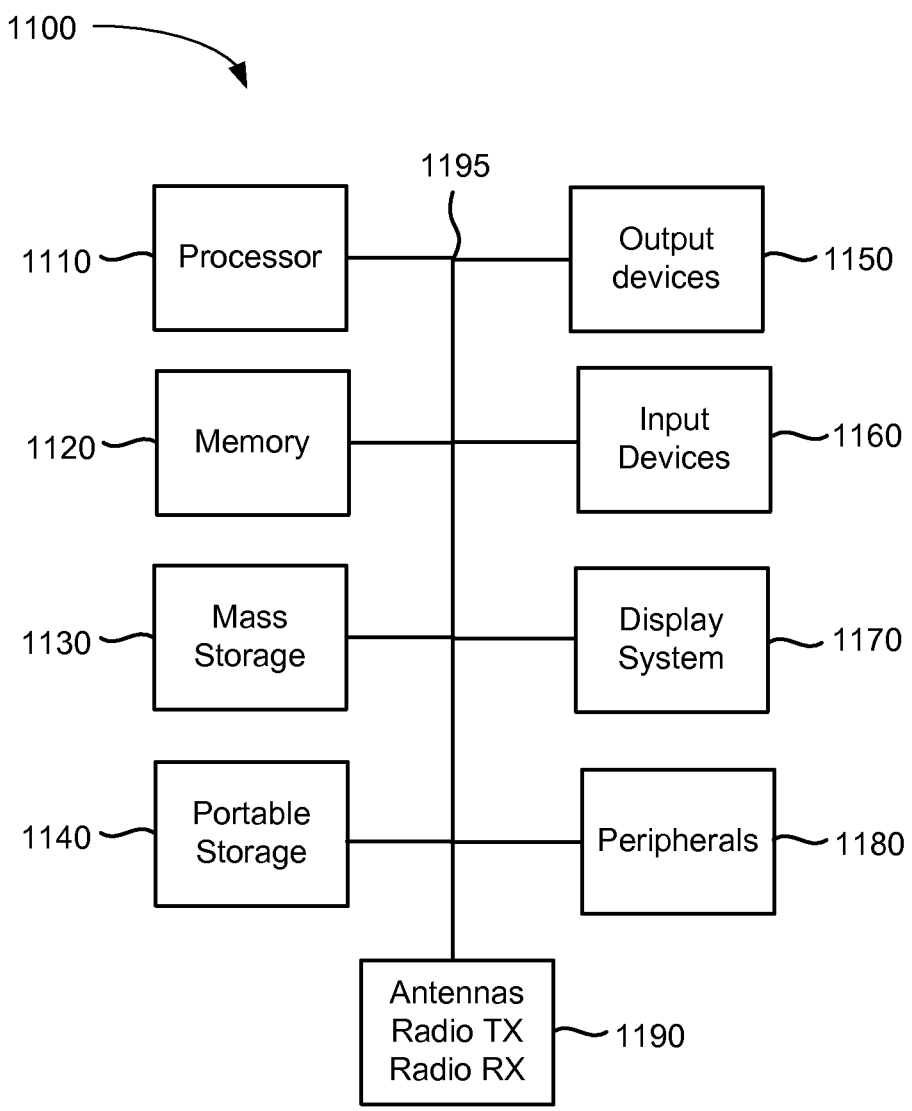
FIG. 11 is a block diagram of a computing environment for use with the present technology.

FIG. 11 is a block diagram of a system for implementing the present technology. System 1100 of FIG. 11 may be implemented in the contexts of the likes of client computer 105 and 192, servers 125, 130, 140, 150, 160, and 197, machine 170, data stores 180 and 190, and controller 190. The computing system 1100 of FIG. 11 includes one or more processors 1110 and memory 1120. Main memory 1120 stores, in part, instructions and data for execution by processor 1110. Main memory 1120 can store the executable code when in operation. The system 1100 of FIG. 11 further includes a mass storage device 1130, portable storage medium drive(s) 1140, output devices 1150, user input devices 1160, a graphics display 1170, and peripheral devices 1180.

The components shown in FIG. 11 are depicted as being connected via a single bus 1190. However, the components may be connected through one or more data transport means. For example, processor unit 1110 and main memory 1120 may be connected via a local microprocessor bus, and the mass storage device 1130, peripheral device(s) 1180, portable storage device 1140, and display system 1170 may be connected via one or more input/output (I/O) buses.

Mass storage device 1130, which may be implemented with a magnetic disk drive, an optical disk drive, a flash drive, or other device, is a non-volatile storage device for storing data and instructions for use by processor unit 1110. Mass storage device 1130 can store the system software for implementing embodiments of the present invention for purposes of loading that software into main memory 1120.

Portable storage device 1140 operates in conjunction with a portable non-volatile storage medium, such as a floppy disk, compact disk or Digital video disc, USB drive, memory card or stick, or other portable or removable memory, to input and output data and code to and from the computer system 1100 of FIG. 11. The system software for implementing embodiments of the present invention may be stored on such a portable medium and input to the computer system 1100 via the portable storage device 1140.

Input devices 1160 provide a portion of a user interface. Input devices 1160 may include an alpha-numeric keypad, such as a keyboard, for inputting alpha-numeric and other information, a pointing device such as a mouse, a trackball, stylus, cursor direction keys, microphone, touch-screen, accelerometer, and other input devices Additionally, the system 1100 as shown in FIG. 11 includes output devices 1150. Examples of suitable output devices include speakers, printers, network interfaces, and monitors.

Display system 1170 may include a liquid crystal display (LCD) or other suitable display device. Display system 1170 receives textual and graphical information, and processes the information for output to the display device. Display system 1170 may also receive input as a touch-screen.

Peripherals 1180 may include any type of computer support device to add additional functionality to the computer system. For example, peripheral device(s) 1180 may include a modem or a router, printer, and other device.

The system of 1100 may also include, in some implementations, antennas, radio transmitters and radio receivers 1190. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth devices, and other radio frequency networks. The devices may include one or more radio transmitters and receivers for processing signals sent and received using the antennas.

The components contained in the computer system 1100 of FIG. 11 are those typically found in computer systems that may be suitable for use with embodiments of the present invention and are intended to represent a broad category of such computer components that are well known in the art. Thus, the computer system 1100 of FIG. 11 can be a personal computer, hand held computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for detecting an anomaly in time-series data, comprising:
   receiving a plurality of time series of original metric data;
   performing a component analysis to generate a plurality of time series of independent metric data;
   performing a function to provide coefficients having a varying granularity for the plurality of time series of independent metric data;
   predicting a value for the independent metric time series data based on the varying granularity coefficients;
   converting the predicted value for the independent metric time series data to an original metric data value; and
   determining the actual value of the original metric time series data is an anomaly if the actual value for the metric differs from the predicted value for the metric by more than a threshold.

2. The method of claim 1, wherein the component analysis includes principal component analysis or independent component analysis.

3. The method of claim 1, wherein the original metrics include a metric time series generated from monitoring an application and a metric time series generated from monitoring a user behavior.

4. The method of claim 1, wherein the function is a discrete waveform transformation function, the varying granularity including wavelet coefficients.

5. The method of claim 1, the method further including generating weighting for each of the coefficients, the predicted value generated based on the weighted coefficients.

6. The method of claim 1, wherein the predicted value is based on coefficients associated with local data that corresponds to local data associated with the predicted value.

7. The method of claim 6, wherein the local data includes temporal and date data.

8. The method of claim 1, further comprising determining an alert based on a detected pattern in a first time series of metric data which is correlated with one or more other time series of metric data.

9. A non-transitory computer readable storage medium having embodied thereon a program, the program being executable by a processor to perform a method for detecting an anomaly in time-series data, the method comprising:
   receiving a plurality of time series of original metric data;
   performing a component analysis to generate a plurality of time series of independent metric data;
   performing a function to provide coefficients having a varying granularity for the plurality of time series of independent metric data;
   predicting a value for the independent metric time series data based on the varying granularity coefficients;
   converting the predicted value for the independent metric time series data to an original metric data value; and
   determining the actual value of the original metric time series data is an anomaly if the actual value for the metric differs from the predicted value for the metric by more than a threshold.

10. The non-transitory computer readable storage medium of claim 9, wherein the component analysis includes principal component analysis or independent component analysis.

11. The non-transitory computer readable storage medium of claim 9, wherein the original metrics include a metric time series generated from monitoring an application and a metric time series generated from monitoring a user behavior.

12. The non-transitory computer readable storage medium of claim 9, wherein the function is a discrete waveform transformation function, the varying granularity including wavelet coefficients.

13. The non-transitory computer readable storage medium of claim 9, the method further including generating weighting for each of the coefficients, the predicted value generated based on the weighted coefficients.

14. The non-transitory computer readable storage medium of claim 9, wherein the predicted value is based on coefficients associated with local data that corresponds to local data associated with the predicted value.

15. The non-transitory computer readable storage medium of claim 14, wherein the local data includes temporal and date data.

16. The non-transitory computer readable storage medium of claim 9, further comprising determining an alert based on a detected pattern in a first time series of metric data which is correlated with one or more other time series of metric data.

17. A system for detecting an anomaly in time-series data, comprising:
   a server including a memory and a processor; and
   one or more modules stored in the memory and executed by the processor to receive a plurality of time series of original metric data, perform component analysis to generate a plurality of time series of independent metric data, perform a function to provide coefficients having a varying granularity for the plurality of time series of independent metric data, predict a value for the independent metric time series data based on the varying granularity coefficients, convert the predicted value for the independent metric time series data to an original metric data value, and determine the actual value of the original metric time series data is an anomaly if the actual value for the metric differs from the predicted value for the metric by more than a threshold.

18. The system of claim 17, wherein the component analysis includes principal component analysis or independent component analysis.

19. The system of claim 17, wherein the original metrics include a metric time series generated from monitoring an application and a metric time series generated from monitoring a user behavior.

20. The system of claim 17, wherein the function is a discrete waveform transformation function, the varying granularity including wavelet coefficients.

21. The system of claim 17, the method further including generating weighting for each of the coefficients, the predicted value generated based on the weighted coefficients.

22. The system of claim 17, wherein the predicted value is based on coefficients associated with local data that corresponds to local data associated with the predicted value.

23. The system of claim 22, wherein the local data includes temporal and date data.

24. The system of claim 17, further comprising determining an alert based on a detected pattern in a first time series of metric data which is correlated with one or more other time series of metric data.

* * * * *